Oct. 30, 1951 S. W. HARRISON 2,572,858

ELECTRON OPTICAL SYSTEM

Filed April 29, 1949 2 SHEETS--SHEET 1

INVENTOR.

Shirley W. Harrison

BY [signature]

ATTORNEY

INVENTOR.
Shirley W. Harrison
BY [signature]
ATTORNEY

Patented Oct. 30, 1951

2,572,858

UNITED STATES PATENT OFFICE 2,572,858

ELECTRON OPTICAL SYSTEM

Shirley W. Harrison, Jackson Heights, N. Y., assignor to Sylvania Electric Products Inc., a corporation of Massachusetts Application April 29, 1949, Serial No. 90,343

9 Claims. (Cl. 315—1)

The present invention relates to electron-optical devices, more particularly to the cathode-ray tubes having means for focusing an electron beam and deflecting it variously. It is particularly applicable to picture tubes in television receivers and is therefore described principally in this connection.

In a cathode-ray tube, the ray or beam is formed in an electron gun and is so focused as to produce a spot of minimum area and greatest intensity at some part of the screen, usually at the center of the screen. By means of varied transverse deflection fields, the beam is caused to scan the screen regularly, and an image is produced by varying the beam intensity from point to point, as is well known. The sharpness and contrast of the image depend greatly on the maintenance of sharp focus everywhere on the screen.

The beam is usually focused at the center of the screen by adjusting the relative potentials of the electrodes in the gun, with no deflecting fields in effect. When the beam is deflected through small angles, it has heretofore been noted that the focus of the beam is impaired moderately, and the deflection-defocusing increases seriously with wider angles of deflection. This effect is noticeable in electro-magnetic deflection systems where the deflection angle is great, and is more pronounced with electrostatic deflecting fields for even moderate angles.

In previous approaches to the problem of deflection-defocusing, various systems have been advanced for correcting the beam-focus for deflection-defocusing caused by one of a pair of mutually perpendicular deflection fields. The problem of correcting for defocusing due to deflection fields capable of scanning the entire area of a cathode-ray screen is considered in copending application Serial No. 752,157 filed June 3, 1947, by R. G. E. Hutter. Copending application Serial No. 50,417 filed September 21, 1948, by W. F. Schreiber is also concerned with the deflection-defocusing problem. The present invention is principally concerned with the correction or compensation for beam-defocusing incidental to beam-deflection. More generally, the present invention provides certain novel electron-optical systems having special application to the deflection-defocusing problem.

In accordance with one aspect of the invention, beam-defocusing caused by mutually perpendicular transverse deflection field, each energized by a separate power supply, is largely obviated by applying composite voltages derived from both of the deflection power supplies to novel combined cylindrical and spherical electron-focusing electrodes. In another aspect, the invention provides an electron lens system that is not merely adjustable in focal length but one having a converging or diverging cylindrical effect which is shiftable through 90°.

The invention will be more fully appreciated from the following detailed disclosure of an illustrative embodiment shown in the accompanying drawings, wherein.

Figure 1:
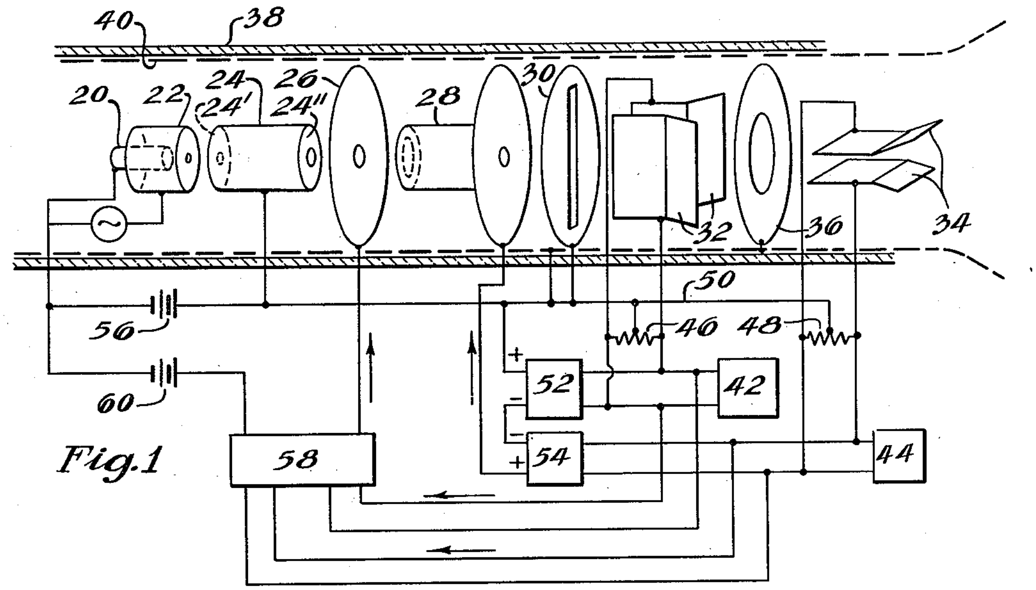
Fig. 1 is a schematic representation of the electrodes in a novel cathode-ray picture tube for a television receiver, employing mutually perpendicular electrostatic deflection fields.
Figures 2, 3:
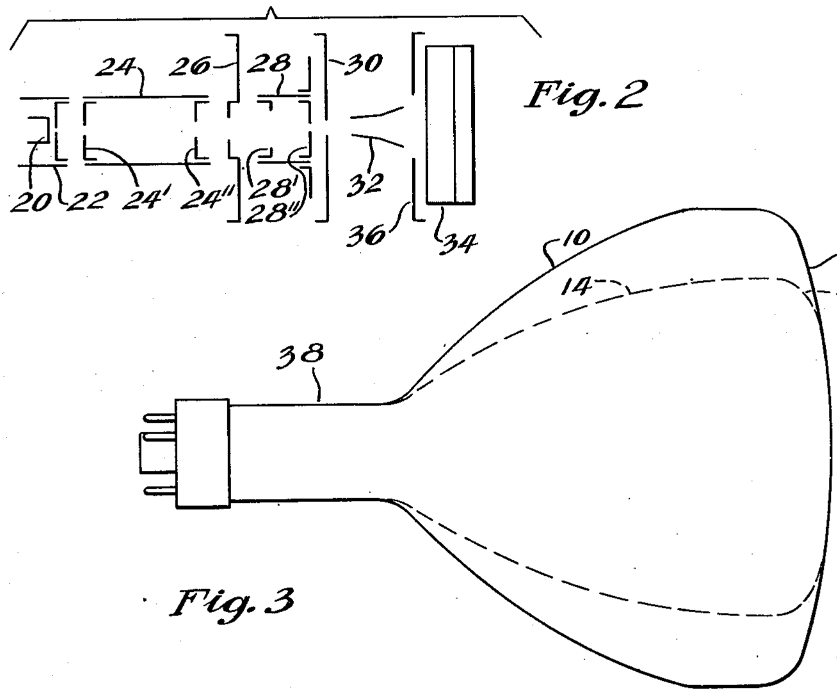
Fig. 2 is a longitudinal cross-sectional view in the horizontal plane, perpendicular to the plane of Fig. 1, of the electrodes drawn to scale and showing their relative positions and proportions.
Fig. 3 is a lateral external view of a cathode-ray picture tube employing wide-angle deflection, showing its proportions in comparison to a standard type of tube of the same overall length and having a much smaller screen.
Figure 4:
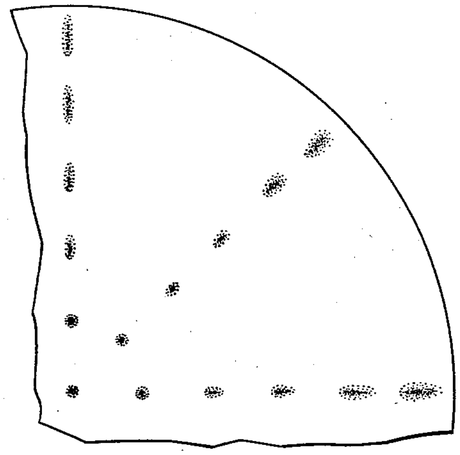
Figure 5:
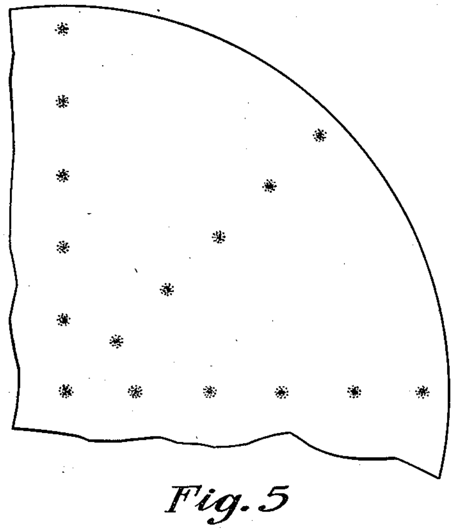
Figure 6:
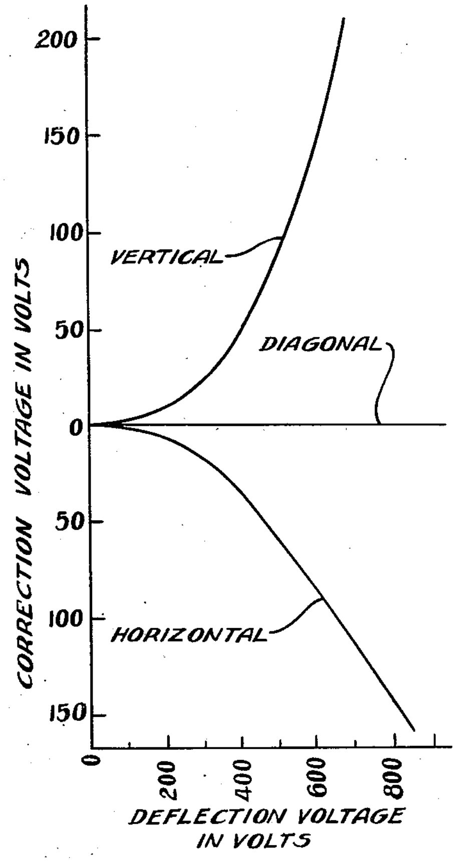
Figure 7:
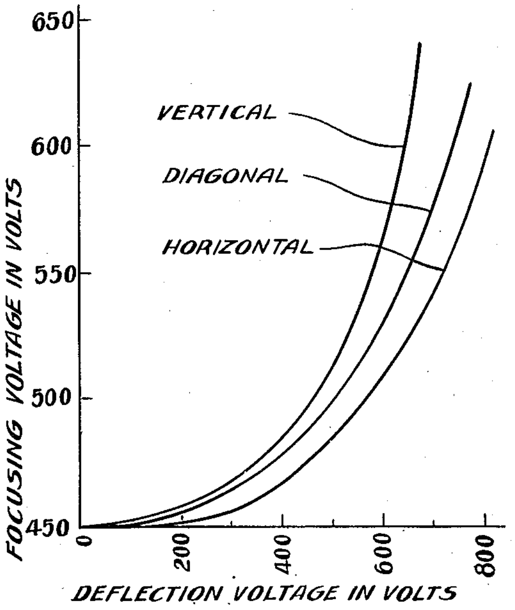

Figs. 4 and 5 are views of a quadrant of the wide-angle tube in Fig. 3 without correction, and with focus-correction in accordance with the invention, respectively; and Figs. 6 and 7 are graphs of the correction voltages required to correct for deflection defocusing using the electrodes and circuit of Figs. 1 and 2. "Deflection voltage" is here used to mean the square-root of the sum of the squares of the deflection voltages.

In Fig. 4 one quadrant of the screen of a conventional cathode-ray tube is shown with multiple spots of the electron beam produced at different times along the vertical, the horizontal, and the diagonal lines of deflection. At the center and near the center, the focus is good. In the deflection extremes, the spot is enlarged and is roughly elliptical. This is because the deflection fields act differently on the different cross-sectional parts of the beam which cannot properly be considered to be of zero transverse dimensions. When the beam is subjected to relatively strong deflection fields such as are necessary for wide-angle deflection, the focus of the beam is foreshortened, principally in the deflection plane, and an enlarged, out-of-round spot is produced. The effect is noticeable at the radial extremities of the seven-inch screen of a conventional picture tube employing electrostatic deflection. The envelope 14 and screen 16 of a tube having a seven-inch screen are shown in Fig. 3. In this figure a wide-angle tube 10 is also shown, having a screen 12 that is ten inches in diameter. The wide-angle tube is no greater in length than the tube having conventional electrodes and conventional proportions. The wide-angle tube when constructed to embody the present invention has superior spot definition to the conventional seven-inch tube. Fig. 5 shows the same quadrant of screen 12 when novel corrective devices are properly in effect.

In Fig. 2, multiple electrodes of a novel cathode-ray tube are shown including a cathode 20, intensity-control electrode or grid 22, and multiple focusing and corrective electrodes 24, 26, 28 and 30. Horizontal deflection plates 32 and vertical deflection plates 34 are mutually isolated by a shield electrode 36. These electrodes are also shown in Fig. 1 where it appears that all of the focusing electrodes except final anode 30 are provided with circular apertures. Electrode 30 is provided with a narrow slit both edges of which are of like potential, and forms part of a variable cylindrical electron lens in the electron-optical system of the cathode-ray tube. The focusing and deflecting electrodes are shown within the neck portion 38 of envelope 10, conventionally of glass and coated internally with a conductive film 40 (Fig. 1) as of aquadag for providing an equipotential surface that is here maintained at the mean potential of the deflection plates.

Electrons emitted from thermionic cathode 20 form a beam that is accelerated by first anode 24. The spot on the screen produced by the beam is variably intensified or reduced to cut-off by control electrode 22. Anode 24 has a circularly apertured end portion 24′ and an oppositely disposed circularly apertured end portion 24″. The apertured end portions are separated by a drift space of substantially uniform potential equal to that of the anode. Anode 28 has circularly apertured end portions 28′ and 28″ similarly separated by an equipotential drift space. Anodes 26 and 28 coact with anode 24 to focus the electron beam in a spot of minimum size at the center of the screen in the absence of deflection fields. The focusing action of these anodes is comparable to that of one or more spherical-surfaced optical lenses; and the electrodes are conveniently termed spherical electron lens means. The focusing action is effected by maintaining a potential difference between adjacent circularly apertured electrodes. It is also influenced by the drift spaces provided and by the mutual separation of the electrodes. These spherical electron lenses are adjustable without changing their physical arrangement, just by changing the potentials and relative potentials of the constituent electrodes.

Slit electrode 30 in the present instance constitutes the final anode of the electron gun. As a final anode it is maintained at the mean potential of deflection plates 32, and of plates 34, and of the aquadag film. This avoids influencing the deflection and the resulting pattern produced at the screen. When proper potentials are applied between electrode 28 and slit electrode 30 a field producing a cylindrical electron lens comparable to a cylindrical optical lens is produced. The cylindrical electron lens constitutes an electron-focusing field which in effect resembles an optical cylindrical lens in producing equal increased or decreased convergence in spaced parallel planes. The physical axis of a cylindrical optical lens is perpendicular to these planes, and in like sense the cylindrical electron lens may be regarded as having an axis perpendicular to the above parallel planes. Electrodes 28 and 30 together constitute an electron lens that is in part cylindrical in the optical sense, and as part of the entire electrode system the cylindrical focal length is adjustable and its axis can be shifted 90°, as will be seen.

The electron-optical system described involves numerous interdependent actions. They may be considered as separate effects, at some risk of oversimplification. The electron beam is affected by the converging cylindrical action of the horizontal deflection field, to an extent that depends on the deflection. To cure this focus distortion, electrode 28 is made negative, which provides a two-dimensional diverging effect—or a reduced converging effect—between circular apertured electrode 28 and slit electrode 30, in the vicinity of slit electrode 30. By proper relative potentials, the cylindrical lens action of the deflection field can be nullified by the two-dimensional action of electron lens 28—30. At the same time, there is a strengthened axially symmetric focusing action—or foreshortened spherical focus—due to the same corrective lens 28—30, in the vicinity of circular apertured electrode 28. This might or might not require correction, depending on design of the remainder of the electron gun, because there is concurrently a reverse change in spherical focusing action, a weakening of spherical focus, between electrodes 26 and 28 when the potential of the latter is changed. In the assembly of Fig. 2, it develops that there is a net change in spherical focus, a change that is corrected by increasing the normal static positive potential of electrode 26, introducing spherical electron-lens action between fixed-potential electrode 24 and electrode 26, and between electrodes 26 and 28.

A different voltage is required for different horizontal deflection voltages for both electrodes 28 and 26, depending non-linearly on the deflection voltage. The correction voltage required by electrode 28 for horizontal deflection both to right and left of center is seen in Fig. 6 to be negative, being zero at center. The corresponding correction voltage for electrode 26 is positive to varied extent, as shown in Fig. 7.

The electron beam is at times subjected to the vertical deflection field alone, which imposes a cylindrical converging effect on the beam in the vertical plane. The spherical focus of electron lens 28—30 can be weakened by making electrode 28 positive in relation to slit electrode 30, and an accompanying cylindrical strengthening of the focus in the horizontal plane can be established. This cylindrical action is made just sufficient to achieve spherical focus in spite of the cylindrical electron lens action of the vertical deflection field.

A change in spherical focus accompanies the change in potential difference between electrodes 26 and 28, and the whole system might then be properly focused with critical design of the electrode assembly and potential values; but it is found that, with the electrodes of Fig. 2, a change in spherical focus is required to maintain focus on the screen. Correction potentials for electrodes 28 and 26 are shown in Figs. 6 and 7 respectively.

When the horizontal and vertical deflections are such that there is deflection along approximately a 45° radius, the cylindrical converging lens actions of the deflection fields are equal and there is a net spherical strengthening of the focus. To correct for this foreshortening of the focal length of the whole system, the focus of the beam is weakened spherically, by adjusting the potential of electrode 26 in the positive direction in the illustrated embodiment. No correction voltage is applied to electrode 28. This discussion applies more accurately to lines slightly displaced angularly from the 45° diagonals, in the practical case, because of the different geometry of the two pairs of deflection plates and their relationship to the gun and the screen. This refinement is to be taken into account in the design of the correction voltage supplies.

The copending application of R. G. E. Hutter, mentioned above, considers the possibility of a single slit electrode used either parallel to a single deflection field or perpendicular to it for correcting beam distortion due to that single field. In the present invention an electron-optical system having only one cylindrical electron lens element is used to correct for beam-distortion due to both deflection fields, as will be understood from the foregoing description of the illustrative embodiment of the invention.

It is desirable that the final anode be maintained at constant potential, from the viewpoint of isolating the focusing problem and the deflection pattern; and for this reason final anode 30 has been described as having a connection to the constant-potential aquadag coating. In some uses the final anode may have varying potentials applied, as for the purpose of correcting for image distortion, and in that event a certain redesign of the electrode assembly and of the required correction-potential curves would be in order.

The final electrode is shown as having a slit parallel to the edges of the first pair of deflection plates. However the invention in a broad aspect contemplates the inclusion of electrodes comprising a cylindrical electron lens at any point in the system to compensate for beam distortion due to both deflection fields.

The circuit connections for applying the corrective voltages to the illustrated tube are shown in Fig. 1. Deflection supplies 42 and 44 for the horizontal and vertical deflection plates, respectively, are provided with resistors 46 and 48 having center-taps connected to line 50 to which aquadag coating 40 and electrodes 24 and 30 are also joined. This line is maintained positive with respect to the cathode 20 by static direct-current supply 56. Shaping circuits 52 and 54 for generating the potentials at every instant corresponding to the deflection potentials in Fig. 6 are energized separately by supplies 42 and 44, and are connected in series-opposition between line 50 (electrode 30) and electrode 28, in such polarity that unit 52 drives electrode 28 negative, while unit 54 drives electrode 28 positive. The net effect is zero along the diagonals of the picture field, where the spot elongation caused by one deflection field is equal and at right angles to the spot elongation caused by the other deflection field. They are both zero when the deflection fields are zero and the beam is centered.

The deflection signals are also applied to unit 58 that is designed to combine and shape the deflection voltages and to add the static potential of supply 60 as is indicated in Fig. 7. The combination is achieved, to a good approximation, by shaping the separate signals first, and adding the separately shaped voltages.

The individual shaping and combining units interconnected in Fig. 1 may take varied form, such as is suggested in the copending Hutter and Schreiber applications mentioned above. Any suitable units may be combined that meet or satisfactorily approximate the wave-form requirements indicated in Figs. 6 and 7 for the particular electrode system shown in true proportion in Fig. 2. Manifestly electrode systems proportioned and arranged differently will require different magnitudes of voltages, and different wave-shapes. Other latitudes of design will occur to those skilled in the art, as well as other applications of the invention than that particularly described. Consequently the appended claims should be allowed due latitude of interpretation to accord with the spirit and scope of the invention.

What is claimed is:

1. A cathode-ray device comprising a target, means for forming and projecting an electron beam along a given path toward said screen, horizontal and vertical deflecting electrodes, beam-deflection power supplies connected separately to said deflecting means for causing the beam to scan substantially the entire target, said beam inherently being defocused incidental to deflection by said horizontal and vertical deflection electrodes, said beam-forming and projecting means incorporating a corrective electron lens system including spherical focusing means and a single cylindrical lens component, and coupling and shaping circuits between both said beam-deflection power supplies and said cylindrical lens component and said spherical focusing means for compensating for the deflection defocusing of the electron beam.

2. A cathode-ray device having means for providing an electron beam and means for producing a pair of mutually perpendicular beam-deflection fields, separate deflection power supplies, and only a single pair of electrodes having a cylindrical beam-focusing effect, a voltage generating and shaping circuit energized by both said power supplies and connected between said electrodes to vary the effective focal length and shift the axis of cylindrical focus substantially opposite to the intrinsic cylindrical defocusing action of the deflecting fields.

3. A cathode-ray tube including a screen, electrodes for producing mutually perpendicular deflection fields, and means for producing and focusing an electron beam scanned by both fields over said screen, said means including only one slit electrode in addition to multiple circular-apertured electrodes, said slit electrode and an immediately adjacent circular-apertured electrode having separate means for connection to external circuits so as to constitute a variable cylindrical electron lens.

4. A cathode-ray tube having an electron-emissive cathode, first and second pairs of electrostatic deflection plates mutually perpendicular to each other, plural electron-focusing and focus-correcting electrodes between said cathode and said deflecting plates including only one slit electrode, said slit electrode being positioned closer to said deflection plates than any other of said focusing electrodes.

5. A cathode-ray device in accordance with claim 4 wherein the slit of said slit electrode is parallel to the edges of the immediately adjacent deflection plates.

6. A cathode-ray tube including a pair of mutually perpendicular beam-deflecting means, and an electron gun for producing a focused electron beam, said gun including a succession of circularly apertured electrodes having separate external connections and having a single electrode formed with a transversely elongated aperture and positioned at an extremity of said succession of circularly apertured electrodes.

7. A cathode-ray tube including a gun for projecting a focused beam of electrons along a path, means for deflecting the projected beam in mutually perpendicular directions, and an equipotential conductor enclosing said gun and the path of the beam through the deflecting fields, said gun having only one electrode having a transversely elongated aperture, said electrode being connected to the equipotential conductor and constituting the final focusing electrode of said gun.

8. The cathode-ray tube of claim 7 in combination with power supplies for energizing said deflecting means, said power supplies having mean-potential output points connected to said electrode having an elongated aperture.

9. An electron lens system having means for projecting and focusing an electron beam including an electrode having a transversely elongated aperture positioned symmetrically about the path of the beam and an adjacent electrode having a circular aperture, and a voltage supply adapted to apply a potential difference to said electrodes of both polarities, whereby cylindrical electron lens actions result the axis of which is shifted through 90° upon reversal of polarity.

SHIRLEY W. HARRISON.

REFERENCES CITED

The following references are of record in the file of this patent:

UNITED STATES PATENTS

| Number | Name | Date |
|---|---|---|
| 2,077,272 | Schlesinger | Apr. 13, 1937 |
| 2,137,353 | Schlesinger | Nov. 22, 1938 |
| 2,197,899 | Schlesinger | Apr. 23, 1940 |
| 2,227,087 | Hinsch | Dec. 31, 1940 |
| 2,287,408 | Baldwin, Jr. | June 23, 1942 |
| 2,455,977 | Bociarelli | Dec. 14, 1948 |
| 2,456,809 | Bedford et al. | Dec. 21, 1948 |
| 2,458,891 | Boyle | Jan. 11, 1949 |